June 1, 1926. 1,586,792

E. B. FLOWERS ET AL

NUT LOCK

Filed March 26, 1926

Inventors
E. B. Flowers,
N. E. Stump,
By their Attorney

Patented June 1, 1926.

1,586,792

UNITED STATES PATENT OFFICE.

EDWARD B. FLOWERS AND NOAH E. STUMP, OF AKRON, OHIO.

NUT LOCK.

Application filed March 26, 1926. Serial No. 97,627.

It is the purpose of this invention to provide a nut lock which although applicable for use in many places, is especially adapted for locking nuts used in connection with the fish plates usually employed for fastening together ends of adjacent rails on a railroad or the like. The embodiment of the invention hereinafter disclosed is simple and easy to manufacture and can be applied with very little additional labor. It is efficient in operation and can be removed without difficulty if at any time it is desired to unscrew the nut.

The adjacent ends of two rails A and B are provided with fish plates C through which and the rail pass bolts D provided with the usual or any suitable heads E and having screwed on their threaded ends nuts F. These parts are or may be of any old or desired form. The nuts F may be hexagonal in outline as illustrated, or square, or any other suitable angular form. The rails have the usual bottom flanges G.

Figure 3:
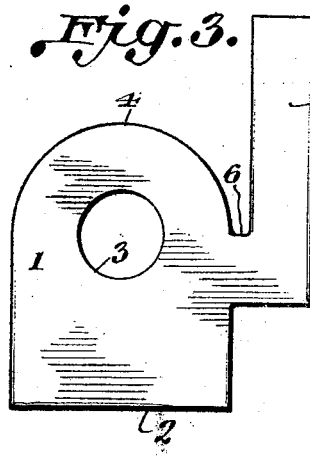
Figure 3 is a plan view of the blank from which the nut lock is formed.

The nut lock is first formed as a blank such as shown in Figure 3 and comprises a body portion 1 having a lower straight edge 2, a circular opening 3 to fit over the bolt D, and an upper portion 4 which is illustrated as curved but may be of any desired contour. A forwardly extending finger F is attached to the body portion by a short neck 6 of substantially the same size.

Figure 4:
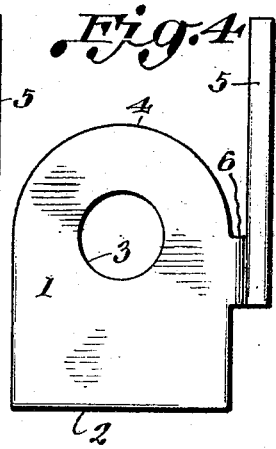
Figure 4 is a similar plan view showing the nut lock in the form in which it is applied to the bolt.

The nut lock is formed for use by bending the finger 5 at the neck 6 until the whole finger lies in a plane at substantially right angles to the body 1 of the nut lock, as shown in Figure 4.

Figure 5:
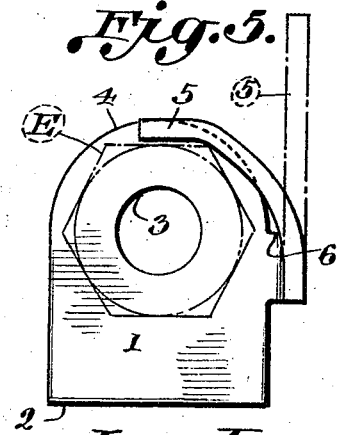
Figure 5 is a similar view showing the locking portion of the nut lock in operative position in full lines and in its previous position in dotted lines.

When it is desired to use the nut lock, it is placed over the bolt D, the body portion 1 serving as a washer between the nut F and the adjacent fish plate C and the lower straight edge 2 substantially engaging the flange G of the rail to prevent any relative turning movement of the body member 1. After the nut is screwed in position, which it will be noticed can be done without any interference from the finger 5 of the nut lock, this finger is then bent from the dotted line position of Figure 5 to the full line position thereof. A portion of this finger will engage one of the angular faces of the nut and lie parallel therewith, thus preventing any rotative movement of said nut.

Figure 1:
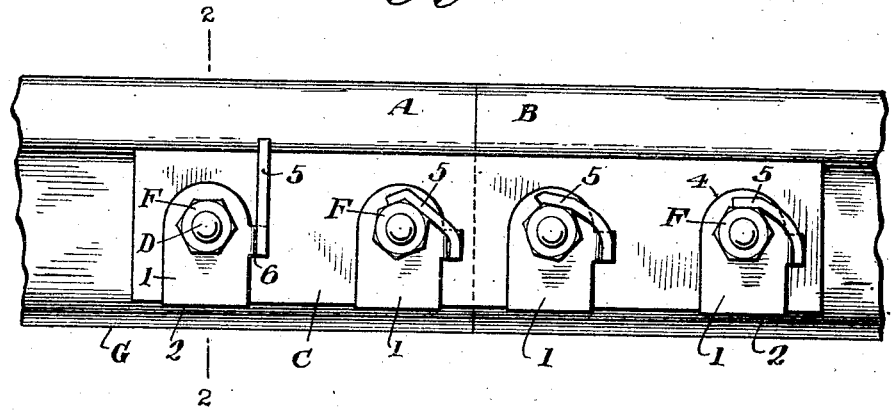
Figure 1 is a side elevation of the adjacent ends of two rails, together with the fish plates and fastening bolts, each nut being provided with a nut lock constructed according to the invention.
Figure 2:
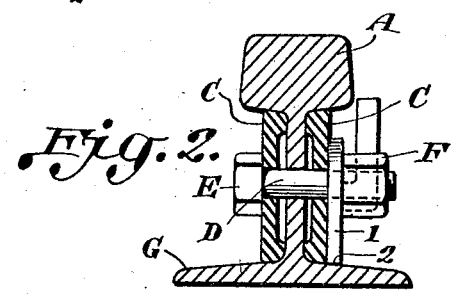
Figure 2 is a transverse section on the line 2—2 of Figure 1.

It will be noted that it is not necessary to turn the nut to any particular position in order that the lock may engage therewith as it will be seen by Figure 1 that a part of the finger 5 may be turned to locking engagement with the nut regardless of the particular rotative position which said nut may occupy. The whole nut lock, or at least the finger 5 and neck 6 are made of steel or other suitable metal which can be bent a number of times without breaking, and it is therefore possible to remove the nut at any time by simply bending back the finger 1 to a position out of engagement with the nut. The use of this nut lock, moreover, does not involve any change in the construction of the nut bolt or any of the connected parts. It may be made of relatively light material since the tendency of the nut to work loose will be readily resisted by the engagement of the finger in any of the positions of the operative nut lock shown in Figure 1. The nut lock shown at the left of this figure discloses the same as applied but before the finger 5 is bent to its operative position.

It will be observed that the principle of the invention may be applied to practically any form of nut or bolt connection wherein one edge of the nut lock engages some part to prevent relative rotation. It is also obvious that the particular material and precise shape can be varied without in any way departing from the spirit of the invention. It is, therefore, understood, that the invention is limited only by the scope of the appended claims.

We claim:

1. A nut lock comprising a plate having an aperture therein to fit over a bolt and having one edge angular to engage a fixed part and prevent rotation of the plate; and a finger extending from one side of the plate and bent into a plane at right angles thereto, said finger being adapted to be bent in a plane at an angle to the first bend and in a plane substantially parallel to the plane of the plate to engage at least one face of the nut and hold the same against rotation.

2. A nut lock comprising a plate having an aperture therein to fit loosely over a bolt and having one edge angular to engage a fixed part and prevent rotation of the plate; and a finger connected to one side of the plate by a narrow neck and bent at that neck into a plane at right angles to the plate, said finger being adapted to be bent in a plane substantially parallel with said plate into engagement with at least one face of the nut to hold the same against rotation.

3. A nut lock for use with rail joints wherein are present the usual flanged rails, fish plates, bolts and nuts, comprising a plate having an aperture to fit loosely over the bolt and having its lower edge straight to contact with the rail flange and prevent rotation of the plate; and a finger connected to one side of the plate by a narrow neck and bent at that neck into a plane at right angles to the plate, said finger being adapted to be bent in a plane parallel to that of the plate and into engagement with at least one of the faces of the nut irrespective of the position of said nut, thereby to hold it against rotation.

In testimony whereof, we have hereunto subscribed our names.

EDWARD B. FLOWERS.
NOAH E. STUMP.